US006465980B1

(12) United States Patent
Orsat

(10) Patent No.: US 6,465,980 B1
(45) Date of Patent: Oct. 15, 2002

(54) DEVICE FOR CONTROLLING A DRIVE MOTOR OF A ROLLER BLIND

(75) Inventor: Jean-Michel Orsat, Chatillon-sur-Cluses (FR)

(73) Assignee: Somfy, Cluses (FR)

( * ) Notice: Subject to any disclaimer, the term of this patent is extended or adjusted under 35 U.S.C. 154(b) by 0 days.

(21) Appl. No.: 09/332,453

(22) Filed: Jun. 14, 1999

(30) Foreign Application Priority Data

Jun. 22, 1998 (FR) ........................................... 98 07822

(51) Int. Cl.[7] ................................................. H02P 7/00

(52) U.S. Cl. ....................... 318/466; 318/432; 318/434; 318/466; 318/468; 160/291; 160/293.1; 160/DIG. 17; 160/130

(58) Field of Search ................................ 160/1, 7, 130, 160/291, 293.1, 311, 904, DIG. 17; 318/432–434, 466, 468

(56) References Cited

U.S. PATENT DOCUMENTS 4,196,462 A 4/1980 Pohl
5,789,917 A 8/1998 Oudet et al.
5,850,131 A 12/1998 Wolfer et al.
6,215,265 B1 * 4/2001 Wolfer et al. ............... 318/434

FOREIGN PATENT DOCUMENTS

DE 27 26 696 C3 8/1980
DE 31 30 035 C1 11/1982
DE 196 10 877 A1 1/1987
DE 39 33 266A A 1/1991
DE 44 40 449 A1 A 6/1995
EP 0552 459A1 A 7/1993
EP 0 703 344A1 D A 3/1996
EP 0 822 316 A2 2/1998
EP 0 665 416 B1 5/1998

* cited by examiner

*Primary Examiner*—Robert E. Nappi
*Assistant Examiner*—Rina I. Duda
(74) *Attorney, Agent, or Firm*—Bugnion S.A.; John Moetteli

(57) ABSTRACT

Device for controlling a drive motor of a roller blind having stackable slats, the device identifying the type of end travel for the roller blind and operating by analyzing the variation in the drive torque. The automatic control adapts the control of the stopping of the motor to the type of end travel identified. The automatic control preferably includes a logical processing unit (3) containing a program for analyzing the variation in the torque.

11 Claims, 3 Drawing Sheets

DEVICE FOR CONTROLLING A DRIVE MOTOR OF A ROLLER BLIND

BACKGROUND OF THE INVENTION

The present invention relates to a device for controlling a drive motor of a motorized roller blind consisting of stackable slats, said device comprising an automatic control reacting to a variation in the drive torque.

It is known, from a relatively large number of documents and installations in operation, to measure the drive torque and control the stopping of the motor as a result of a comparison of the measured torque with a reference value.

The device described in the patent application DE 196 10 877, the content of which is incorporated by reference, uses a torsion bar acting on two strain gauges, for example piezoelectric sensors. The device described in the patent application EP 0 822 316, the content of which is incorporated by reference, uses a spring which opposes the rotation of the housing of the motor, this rotation being detected by optical sensors or an angular displacement sensor In the device according to the patent EP 0 703 344, the content of which is incorporated by reference, the torque value thresholds are determined by two springs which oppose the rotation of the housing of the motor, said rotation acting directly on two switches controlling the feed of the motor. When the roller blind is being wound up, the motor is stopped, after the blind has executed a predetermined travel, from the moment when the torque has reached the threshold determined by the corresponding spring.

In the case of a single-phase asynchronous motor with a phase shifting capacitor, it is known to use one or two operating parameters of the motor in order to determine the torque threshold. It has been proposed, for example, to use the voltage measured at the terminals of the phase shifting capacitor (DE-A-27 26 696, DE-C-31 30 035, the contents of which are incorporated by reference) or the starting voltage on the winding of the motor, which is compared with the feed voltage (U.S. Pat. No. 4,196,462, the content of which is incorporated by reference) or the voltage at the terminals of the auxiliary winding of the motor or else the phase shift of the currents in the main winding and in the auxiliary winding.

All the known devices require a setting which depends on the dimensions and weight of the roller blind, on the method of fastening it to the winding tube and on the conditions of its installation, in particular the amount by which it is unwound. As regards the type of fastening of the roller blind to its winding tube, this fastening may be ensured, in particular, by means of metal foil, a strap or a bolt. The settings will be different, depending on the fitting of the roller blind and its type of fastening to its winding tube. In particulars if the roller blind is fastened to its winding tube by means of metal foil, that is to say a steel leaf forming a spring, when the slats of the roller blind are fully stacked the winding tube will have an elastic play which will result in a relatively slow variation in the drive torque. By contrast, if this fastening is ensured by means of a strap, the torque will temporarily remain zero until the roller blind is rewound in the opposite direction, whilst if the fastening is ensured by means of a bolt, that is to say is rigid, the torque will increase abruptly under the same conditions.

It is known to dispense with these settings by causing the automatic control to learn the torque curve of the motor after installation. In this case, if the motor is removed in order to be installed in another winding tube, a new learning procedure is necessary Aging of the installation and the change in the friction forces may also make a new learning process necessary, in order once again to obtain complete closing or opening of the roller blind. Therefore, what is needed is a cut-off algorithm which dispenses with the setting and learning processes.

SUMMARY OF THE INVENTION

The control device according to the invention is defined in that its automatic control comprises means for identifying the type of end travel associated with the type of fastening of the roller blind, said means operating by analyzing the variation in the drive torque, and means for adapting the control of the stopping of the motor to the type of end travel identified.

On the basis of the analysis of the variation in the drive torque, that is to say of the curve representing this variation, the automatic control is thus capable of recognizing whether the roller blind is being wound up or, on the contrary, whether the slats are being stacked up. If the blind is being wound up, the control device can simply stop the motor when the variation in the drive torque exceeds a particular value corresponding to the arrival of the last slat of the roller blind at its upper limit. By contrast, if the automatic control has identified that the slats are being stacked up, it can initiate a special procedure for analyzing the trend of the drive torque, in order to identify the type of connection of the apron of the roller blind to its winding tube and to control the stopping of the motor according to special criteria adapted to each type of fastening.

For this purpose, the automatic control preferably comprises a logical processing unit (<<LPU>>) containing a program for analyzing the variation in the drive torque, according to which program it is determined whether the roller blind is in the winding or unwinding or stacking or unstacking phase, the detected state is recorded, the detection of a state different from the recorded state is awaited, this different state is recorded, and the type of end of travel is determined by analyzing the sequence of the two recorded states.

If the automatic control has recognized that the roller blind is in the stacking phase, the logical processing unit, after detecting the cancellation of the drive torque corresponding to the end of stacking of the slats, analyzes, by means of a subprogram, the trend of the drive torque, starting from zero: if the torque remains zero for a predetermined time, this corresponding to strap fastening, or if the torque changes relatively slowly from zero, this corresponding to fastening by metal foil, the automatic control immediately interrupts the power to the motor. By contrast, if the torque increases rapidly, signifying rigid bolt fastening, the automatic control interrupts the power to the motor when the variation in the drive torque reaches a predetermined value, as usually occurs when the roller blind arrives at its upper limit.

In the event that the LPU has identified an "unstacking/winding" sequence, a rapid and continuous increase in the torque is detected and the stopping of the motor is controlled when the variation in the torque exceeds a predetermined value. Stopping could also be controlled with a delay, as described in the patent EP 0,703,344.

BRIEF DESCRIPTION OF THE DRAWINGS

The invention will be explained in more detail by means of an exemplary embodiment and with reference to the accompanying drawings in which.

DETAILED DESCRIPTION OF THE PREFERRED EMBODIMENT(S)

Figure 1:
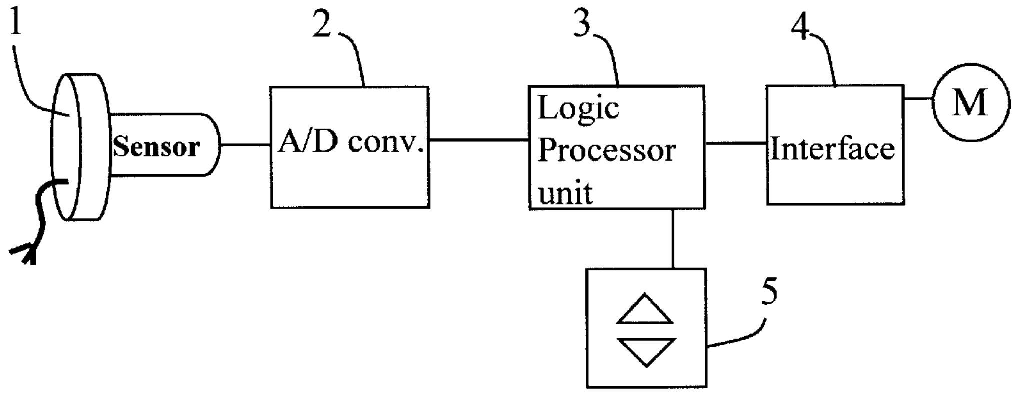
FIG. 1 shows a diagram of a control device of a roller blind.

The control device shown diagrammatically in FIG. 1 comprises a torque detector 1 consisting, for example, of a microdisplacement sensor, as described in the U.S. Pat. No. 5,789,917, the content of which is incorporated by reference, which measures the torsion of a torsion element supporting the motor M, an analog/digital converter 2 converting the signal supplied by the sensor 1 into a digital signal entered in an LPU 3 equipped with a microprocessor, and an interface 4, likewise consisting, in principle, of an analog/digital converter for entering a motor operating parameter measured on the motor and for entering it in the LPU 3. The control device comprises, furthermore, a manual raising/lowering control 5.

Figure 2:
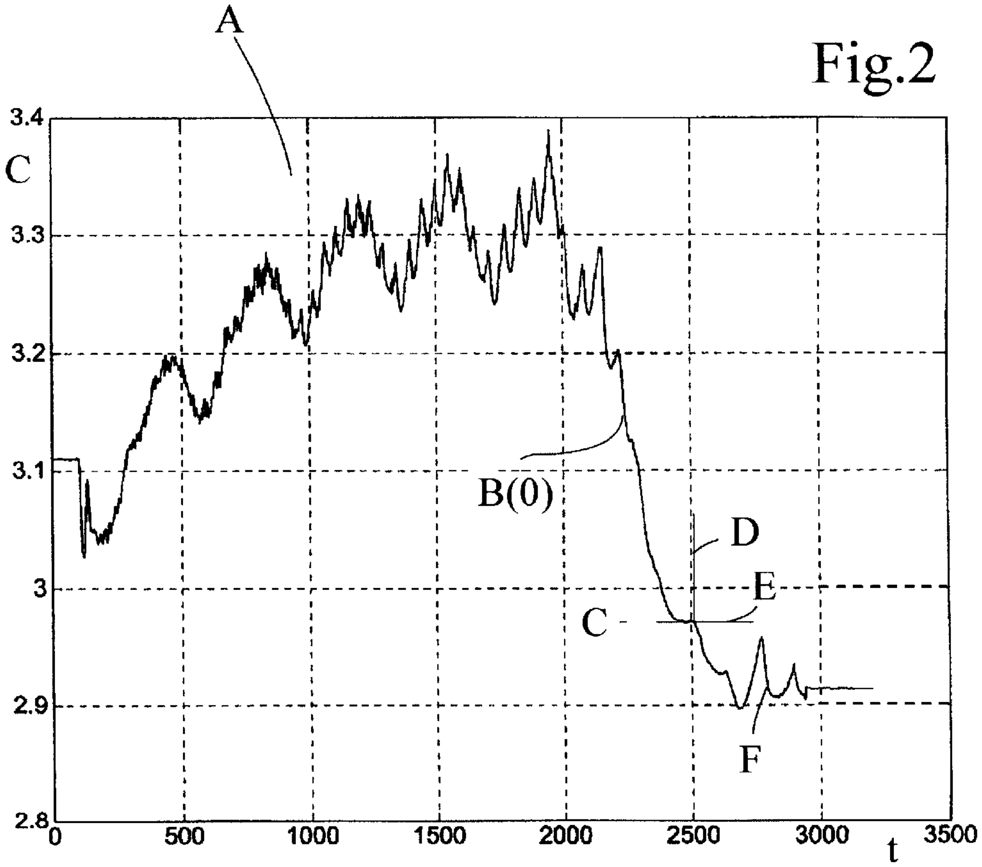
FIG. 2 shows the curve for the drive torque as a function of time.

FIG. 2 shows the profile of the torque C as a function of time t. The time to corresponds to the fully wound-up position. Starting from this position, it is found that the torque first falls abruptly, this corresponding to a relaxation of the wound-up blind, with its last slat bearing against a limit stop, for example a blind casing, arrival at the limit stop having resulted in some tension on the blind, that is to say a torque on the motor. It is then found that, in a zone A, the torque increases according to a wavy curve, this waviness being attributable to the simultaneous variations in the winding diameter and in the number of suspended roller blind slats. A stacking phase subsequently commences, which results in a rapid reduction in the torque corresponding to the part B of the curve.

When all the slats are stacked, the torque reaches a level C where the torque is canceled. Beyond this level C, the torque may change in three different ways, depending on whether it is fastened rigidly by means of a bolt or is fastened by means of a strap or metal foil. If it is fastened by means of a bolt, the motor immediately encounters strong resistance and the torque curve increases very rapidly, as represented by the line D. If, by contrast, the roller blind is fastened by means of straps, these straps relax completely and the torque remains zero, and would remain so, until the roller blind is wound onto its winding tube in the other direction, which, of course, should be avoided. If the roller blind is fastened by means of a metal foil, the elasticity of the latter causes the torque to change relatively slowly and irregularly, as represented by the part F of the curve.

Checking Torque Characteristics

Figure 3:
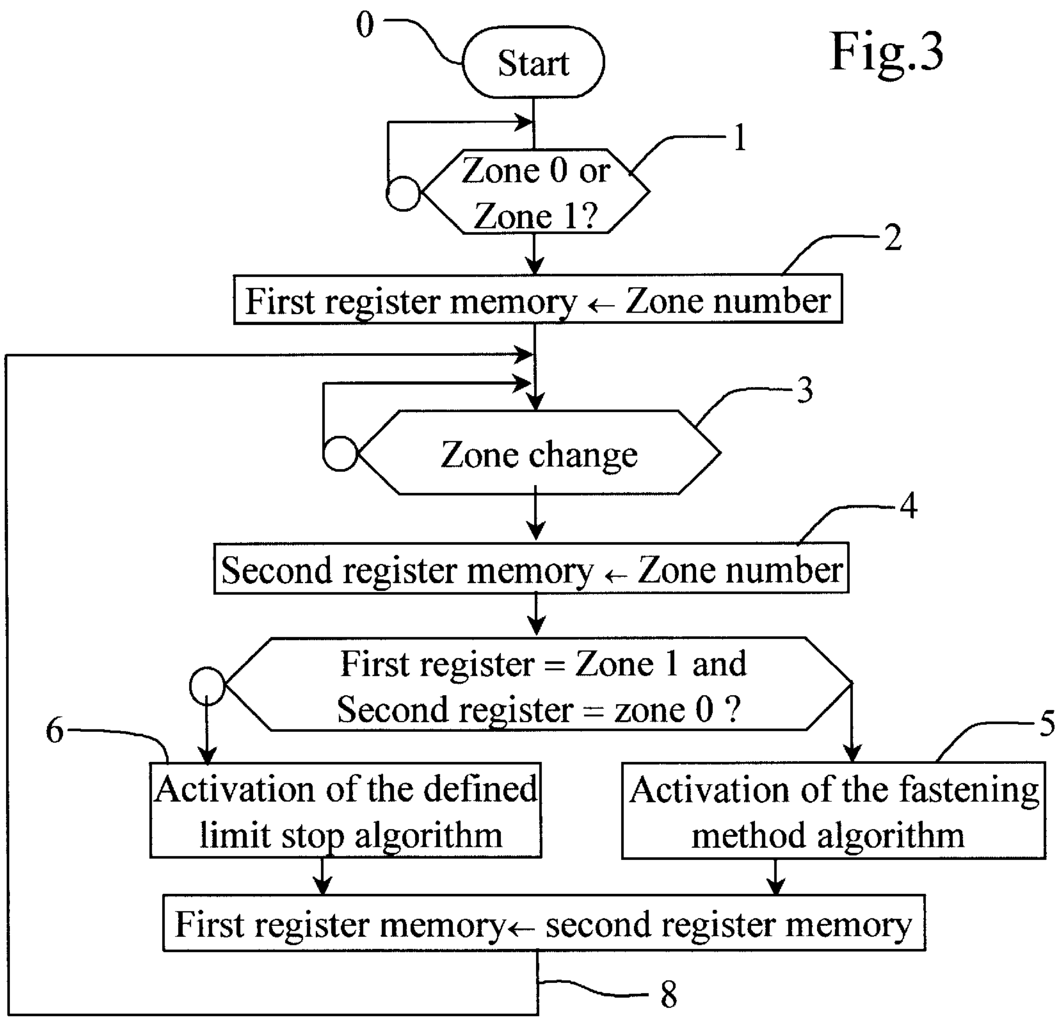
FIG. 3 shows the main algorithm of the program of the LPU (logical processing unit)
Figure 5:
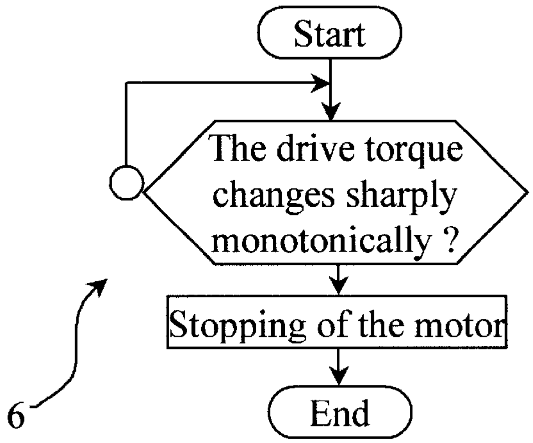
FIG. 5 shows the defined limit stop algorithm.
Figure 4:
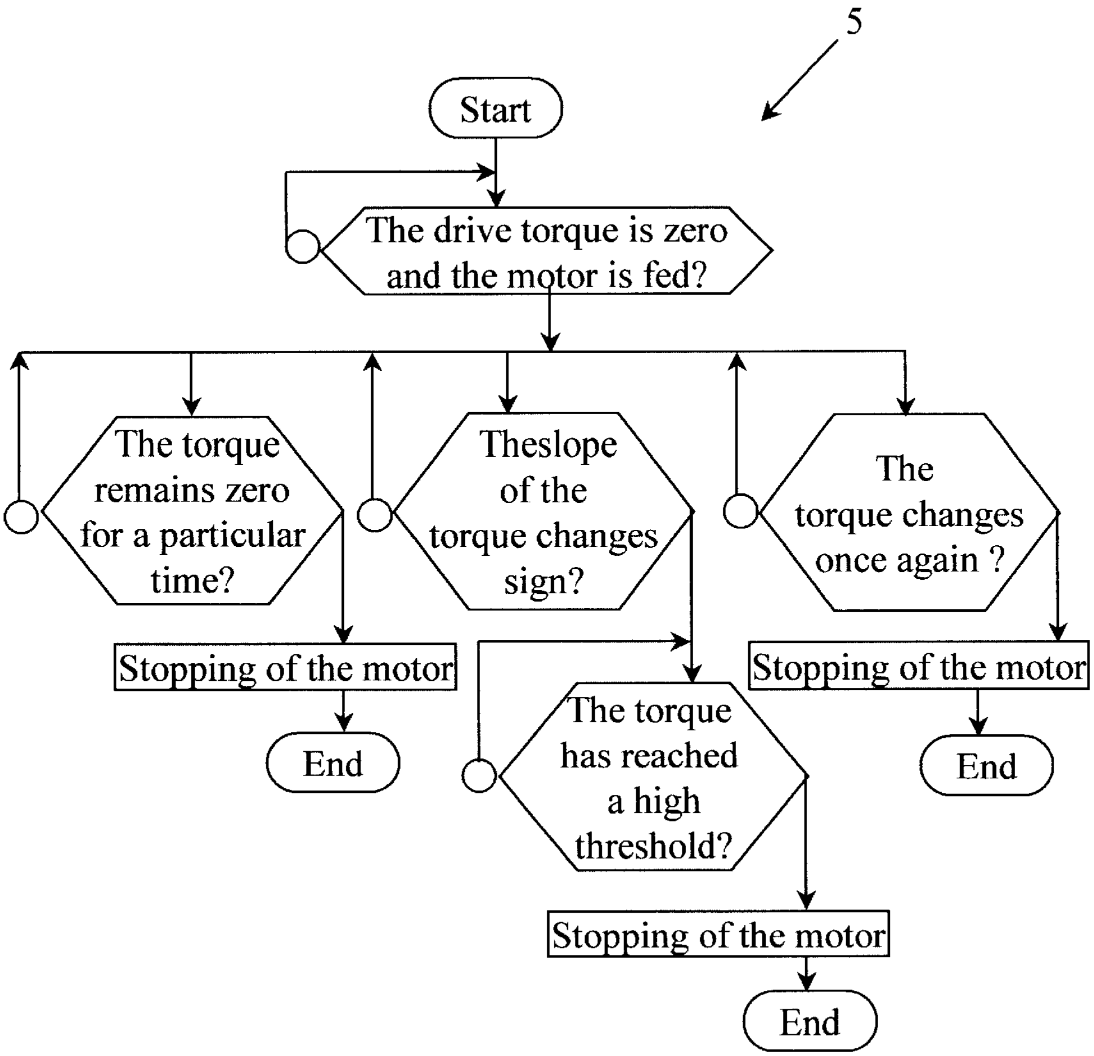
FIG. 4 shows the algorithm of the method of fastening the roller blind.

The curve of the drive torque is analyzed according to the algorithms shown in FIGS. 3 to 5. The zones 1 and 0 correspond respectively to the parts A and B of the curve.

The process of analyzing the curve of the drive torque and the adaptation of the behavior of the stopping device are carried out according to the following steps, the numbering corresponding to the numerals in FIG. 3. Note again that the algorithm begins from an initial start position, which is when the shutters are open.

1. Identification of the zone of the curve by means of a zone indicator counter incremented if the trend of the torque is positive and decremented if the trend of the torque is negative:

If the zone indicator tends to remain absolutely below a particular somewhat low threshold, this means that the counter is successively incremented and decremented and that the winding or unwinding phase consequently takes place, this zone 1 then being signaled by the activation of an indicator "zone 1";

if the zone indicator tends to increase absolutely and exceeds a specific threshold, this means that the roller blind is in the stacking or unstacking phase, the zone then being signaled by the activation of an indicator "zone 0".

2. The identified zone is recorded in a first register.

3. A zone change is detected.

4. The second identified zone is recorded in a second register.

5. The sequence obtained is examined:

If the sequence is "zone 1-zone 0", this means that the roller blind is in the stacking phase, and the "fastening method" algorithm (FIG. 4) is then activated;

if the sequence is "zone 0-zone 1", this means that the roller blind is being wound up, and the "defined limit stop" algorithm (FIG. 5) is then activated.

7. The content of the second register (step 4) is recorded in the first register (step 2).

8. Return to step 3.

Fastening Method Algorithm

If it is determined that the shutter is in Zone 0, the following steps are executed. If not the algorithm checks again until the condition is met. It is detected whether the drive torque is canceled when the motor is fed, this meaning that the slats of the roller blind are stacked and point C is reached. The following three tests are then conducted:

It is tested whether the torque remains zero for a particular time. If so, this means that the blind is in zone E, and the automatic control immediately interrupts the power to the motor.

It is tested whether the slope of the torque changes sign. If so, this means that the blind is in zone D, and the automatic control then interrupts the motor as soon as the torque has reached a high threshold.

It is also tested whether the torque changes once again, but slowly, which then means that the blind is in zone F. The automatic control then immediately interrupts the power to the motor.

Defined Limit Stop Algorithm

It is tested whether the drive torque changes sharply monotonically. If so, this means that the roller blind arrives at its upper end of travel, and the automatic control then immediately interrupts the power to the motor.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A device for controlling a drive motor of a motorized roller blind having stackable slats, said device comprising an automatic control reacting to a variation in the drive torque, wherein said automatic control comprises means for identifying the type of fastening of the roller blind to a corresponding winding tube independently of dimensions and weight of the roller blind, said identifying means operating by analyzing the variation in the drive torque, and means for controlling the timing of the stopping of the motor to the type of fastening identified.

2. A device for controlling a drive motor of a motorized roller blind having stackable slats said device comprising an automatic control reacting to a variation in the drive torque, wherein said automatic control comprises means for identifying the type of fastening of the roller blind to a corresponding winding tube independently of dimensions and weight, said identifying means operating by analyzing the variation in the drive torque, and means for controlling the timing of the stopping of the motor to the type of fastening identified, wherein the automatic control comprises an LPU containing a program for analyzing the variation in the drive torque, according to which program, the following are performed:

determining whether the roller blind is in the winding or unwinding or stacking or unstacking state, recording the detected state, awaiting the detection of a state different from the recorded state, recording this different state, and determining the type of fastening by analyzing the sequence of the two recorded states.

3. The device as claimed in claim 2, wherein, furthermore, the automatic control is programmed in such a way that, in the event that an unwinding/stacking sequence has been determined, the automatic control detects the cancellation of the drive torque corresponding to the end of the stacking of the slats and analyzes the trend of the drive torque from zero, in order to determine the type of fastening and to control the stopping of the motor as a function of the trend detected.

4. The device as claimed in claim 3, wherein, furthermore, the automatic control is programmed so as to interrupt the power to the motor immediately if the torque remains zero for a predetermined time or if the torque changes slowly from zero and, if this torque increases rapidly, to interrupt the power to the motor when the variation in the drive torque reaches a predetermined value.

5. The control device as claimed in claim 2, wherein, furthermore, the automatic control is programmed in such a way that, in the event that an unstacking/winding sequence has been determined, it controls the stopping of the motor when the variation in the drive torque exceeds a predetermined value.

6. The control device as claimed in claim 3, wherein, furthermore, the automatic control is programmed in such a way that, in the event that an unstacking/winding sequence has been determined, it controls the stopping of the motor when the variation in the drive torque exceeds a predetermined value.

7. The control device as claimed in claim 4, wherein, furthermore, the automatic control is programmed in such a way that, in the event that an unstacking/winding sequence has been determined, it controls the stopping of the motor when the variation in the drive torque exceeds a predetermined value.

8. The device as claimed in claim 2, wherein the means for analyzing the variation in the drive torque comprise a counter, this counter being incremented when the torque increases and being decremented when the torque decreases, the automatic control deducing that the roller blind is in the unwinding or winding phase if the state of the counter remains below a particular threshold, and deducing that the roller blind is in the stacking or unstacking phase if the state of the counter exceeds a particular threshold or falls below a particular threshold respectively.

9. The device as claimed in claim 3, wherein the means for analyzing the variation in the drive torque comprise a counter, this counter being incremented when the torque increases and being decremented when the torque decreases, the automatic control deducing that the roller blind is in the unwinding or winding phase if the state of the counter remains below a particular threshold, and deducing that the roller blind is in the stacking or unstacking phase if the state of the counter exceeds a particular threshold or falls below a particular threshold respectively.

10. The device as claimed in claim 4, wherein the means for analyzing the variation in the drive torque comprise a counter, this counter being incremented when the torque increases and being decremented when the torque decreases, the automatic control deducing that the roller blind is in the unwinding or winding phase if the state of the counter remains below a particular threshold, and deducing that the roller blind is in the stacking or unstacking phase if the state of the counter exceeds a particular threshold or falls below a particular threshold respectively.

11. The device as claimed in claim 5, wherein the means for analyzing the variation in the drive torque comprise a counter, this counter being incremented when the torque increases and being decremented when the torque decreases, the automatic control deducing that the roller blind is in the unwinding or winding phase if the state of the counter remains below a particular threshold, and deducing that the roller blind is in the stacking or unstacking phase if the state of the counter exceeds a particular threshold or falls below a particular threshold respectively.

* * * * *